US009737827B2

(12) United States Patent
Wallace

(10) Patent No.: US 9,737,827 B2
(45) Date of Patent: Aug. 22, 2017

(54) SYSTEM FOR REMOVING HIGH PURITY SALT FROM A BRINE

(71) Applicant: Enviro Water Minerals Company, Inc., Houston, TX (US)

(72) Inventor: Paul Steven Wallace, Katy, TX (US)

(73) Assignee: Enviro Water Minerals Company, Inc., Houston, TX (US)

( * ) Notice: Subject to any disclaimer, the term of this patent is extended or adjusted under 35 U.S.C. 154(b) by 764 days.

(21) Appl. No.: 13/965,556

(22) Filed: Aug. 13, 2013

(65) Prior Publication Data
US 2014/0041810 A1 Feb. 13, 2014

Related U.S. Application Data

(60) Provisional application No. 61/682,596, filed on Aug. 13, 2012.

(51) Int. Cl.
*B01D 1/26* (2006.01)
(52) U.S. Cl.
CPC ..................... *B01D 1/26* (2013.01)
(58) Field of Classification Search
None
See application file for complete search history.

(56) References Cited

U.S. PATENT DOCUMENTS

| 4,087,253 | A | * | 5/1978 | Zabotto | ..................... C01D 3/06 159/47.3 |
| 4,127,235 | A | | 11/1978 | Klaile et al. | |
| 4,163,046 | A | | 7/1979 | Subramanian et al. | |
| 4,224,036 | A | * | 9/1980 | Geesen | ..................... B01D 1/26 159/45 |
| 4,298,442 | A | | 11/1981 | Giuffrida | |
| 4,381,232 | A | | 4/1983 | Brown | |

(Continued)

FOREIGN PATENT DOCUMENTS

| WO | 2007094659 A1 | 8/2007 | |
| WO | WO 2010059637 A1 * | 5/2010 | ........... B01D 61/022 |

OTHER PUBLICATIONS

McDonald, M. R., McClintock, J. B., Amsler, C. D., Rittschoff, D., Angus, R. A., Orihuela, B. & Lutostankski, K., "Effects of Ocean Acidification Over the Life History of the Barnacle Amphibalanus Amphitrite," Marine Ecology Progress Series 385:179-187 (2009).

(Continued)

*Primary Examiner* — Sean E Conley
*Assistant Examiner* — Benjamin Whatley
(74) *Attorney, Agent, or Firm* — Fletcher Yoder, P.C.

(57) ABSTRACT

A system for removing high purity salt from a brine. One system includes a first evaporator configured to receive a brine stream, to produce a first output comprising a sodium chloride slurry, and to produce a first intermediate output. The system also includes a second evaporator fluidly coupled to the first evaporator and configured to receive the first intermediate output, to produce a first recovery output, and to produce a second intermediate output. The system includes a third evaporator fluidly coupled to the second evaporator and configured to receive the second intermediate output and to produce a second recovery output. The first recovery output and the second recovery output are used to produce the brine stream received by the first evaporator.

17 Claims, 3 Drawing Sheets

(56) References Cited

U.S. PATENT DOCUMENTS

| | | | |
|---|---|---|---|
| 4,405,463 A | 9/1983 | Jost et al. | |
| 4,436,429 A | 3/1984 | Strong et al. | |
| 4,725,425 A | 2/1988 | Lesher et al. | |
| 5,221,528 A | 6/1993 | Jongema | |
| 5,250,185 A | 10/1993 | Tao et al. | |
| 5,366,514 A | 11/1994 | Becnel, Jr. et al. | |
| 5,417,491 A | 5/1995 | Hornung et al. | |
| 5,765,945 A | 6/1998 | Palmer | |
| 5,858,240 A | 1/1999 | Twardowski et al. | |
| 5,925,255 A | 7/1999 | Mukhopadhyay | |
| 6,030,535 A | 2/2000 | Hayashi et al. | |
| 6,036,740 A | 3/2000 | Miller et al. | |
| 6,183,644 B1 | 2/2001 | Adams et al. | |
| 6,221,225 B1* | 4/2001 | Mani | B01D 61/44 204/523 |
| 6,315,976 B1* | 11/2001 | Phinney | C01C 1/028 423/357 |
| 6,444,095 B1* | 9/2002 | Evans | C07C 41/42 159/17.1 |
| 6,461,491 B1 | 10/2002 | Hryn et al. | |
| 6,482,305 B1 | 11/2002 | Mani | |
| 7,083,730 B2 | 8/2006 | Davis | |
| 7,147,361 B2 | 12/2006 | Cecala et al. | |
| 7,392,848 B1 | 7/2008 | Bader | |
| 7,459,088 B2 | 12/2008 | Davis | |
| 7,501,064 B2 | 3/2009 | Schmidt et al. | |
| 7,595,001 B2 | 9/2009 | Arakel et al. | |
| 7,861,955 B2 | 1/2011 | Tracy et al. | |
| 2007/0189945 A1 | 8/2007 | Kopp et al. | |
| 2008/0099154 A1* | 5/2008 | Minnich | C02F 1/048 159/47.3 |
| 2008/0185340 A1 | 8/2008 | Bargeman et al. | |
| 2008/0237123 A1 | 10/2008 | Marston | |
| 2009/0127360 A1 | 5/2009 | Tracy et al. | |
| 2009/0188867 A1* | 7/2009 | Vuong | B01D 61/025 210/652 |
| 2010/0163471 A1 | 7/2010 | Elyanow et al. | |
| 2011/0027165 A1* | 2/2011 | Stuart | B01D 59/32 423/580.2 |
| 2011/0198285 A1* | 8/2011 | Wallace | C01B 7/03 210/638 |
| 2011/0289846 A1 | 12/2011 | Shaw et al. | |
| 2011/0303607 A1 | 12/2011 | Vora et al. | |

OTHER PUBLICATIONS

Markus Busch, William E. Mickols, Steve Jons, Jorge Redondo, Jean De Witte, "Boron Removal in Sea Water Desalination," International Desalination Association, BAH03-039 (2003).
NRS Engineering Water Solutions, "Final Pilot Study Report—Texas Seawater Desalination Demonstration Project," (Oct. 2008).
Collin Green "Using Gypsum for the Treatment of Mine Water," Department of Chemical and Metallurgical Engineering, Faculty of Natural Sciences, Technikon Pretoria (Dec. 2003).
Stephen R. Grattan "Irrigation Water Salinity and Crop Production," University of California, Davis—Agriculture and Natural Resources, ANR Publication 8066 (2002).
Ittai Gavrieli Amos Bein, and Aharon Oren, "The Expected Impact of the Peace Conduit Project (The Red Sea—Dead Sea Pipeline) on the Dead Sea," Mitigation and Adaptation Strategies for Global Change, 10:3-22 (2005).
DOW Water Solutions, "Filmtec™ Reverse Osmosis Membranes," Technical Manual, Form No. 609-00071; (2010) pp. 1-180.
DOW Water Solutions, "DOWTM Filmtec™ Membranes—DOW™ Filmtec™ SW30XLE-440i Seawater Reverse Osmosis Element with iLEC Interlocking Endcaps," Product Information. Form No. 609-03003-1109; (2010) pp. 1-2.
DOW Water Solutions, "DOW™ Filmtec™ Membranes—DOW™ Filmtec™ SW30ULE-440i Seawater Reverse Osmosis Element with iLEC™ Interlocking Endcaps," Product Information, Form No. 609-03004-1109; (2010) pp. 1-2.
DOW Water Solutions, "Filmtec™ Membranes—Filmtec™ XLE-440 Extra Low Energy RO Element," Product Information. Form No. 609-00245-0606; (2010) pp. 1-2.
DOW Water Solutions, "DOW™ Ultrafiltration—High Turbidity and Temperature Fluctuation No Obstacle for DOW™ Ultrafiltration," Case History, Form No. 795-00020-1108; (2010) pp. 1-5.
FAO Corporate Document Repository, Agriculture and Consumer Protection, "Water Quality for Agriculture"; http://www.fao.org/DOCREP/003/T0234E/TO234E05.htm (Feb. 10, 2010) pp. 1-15.
Seung-Hyun Kim, Jong-Sup Yoon, Seockheon Lee, "Utilization of Floc Characteristics for the Evaluation of Seawater Coagulation Process," Desalination and Water Treatment, Civil Engineering Department, Kyungnam University, Masan, Korea, 10 (2009) 95-100. *Presented at EuroMed 2008.
GE Water and Process Technologies, "Cloromat—Solution for Manufacturing Chlor-Alkali Chemicals: Sodium Hypochlorite, Hydrochloric Acid & Caustic Soda," Fact sheet (May 2008) p. 1-4.
GE Power & Water—Water & Process Technologies, "HERO" (2010) pp. 1-2.
ICL, "Harnessing Nature Creating Value," 3rd Annual NASDAQ-TASE Israeli Investor Conference, New York (Sep. 18, 2008) pp. 1-47.
Applied Membranes, Inc., "Water Treatment Guide—Temperature Correction Factor for Reverse Osmosis Membranes," (2007) pp. 1-2.
Nitto Denko and Hydranautics, "Chemical Pretreatment for RO and NF," Technical Application Bulletin No. 111, Revision C (Dec. 2008) pp. 1-16.
Chemical Processign.com, "To Avoid Silica-Scale Problems in Cooling Towers, Plant Personnel Turn to Unconventional Methods," Water Treatment's Gordion Knot; http://www.chemicalprocessing.com/articles/2003/235.html?page=print; (2003) pp. 1-9.
"Desalination: A National Perspective," Committee on Advancing Desalination Technology, National Research Council, The National Academies—Advisers to the Nation on Science, Engineering, and Medicine (2008) pp. 1-255.
Public Health and the Environment World Health Organization, "Desalination for Safe Water Supply—Guidance for the Health and Environmental Aspects Applicable to Desalination," Geneva (2007) pp. 1-173.
Gerald L. Mackie and Barb Crosbie, "Zebra Mussel Biofouling Control in Cottage and Other Small Volume Water Systems," The Georgian Bay Association (1999) pp. 1-87.
Ki-Won Baek, Sang-Hun Song, Seok-Hwan Kang, Young-Woo Rhee, Chang-Soo Lee, Bum-Jae Lee, Sam Hudson, and Taek-Sung Hwang, "Adsorption Kinetics of Boron by Anion Exchange Resin in Packed Column Bed," J. Ind. Eng. Chem., vol. 13, No. 3, (2007) 452-456.
EPA Selenium Purification_Scandium (1998) pp. 1-62.
Yoshinobu Tanaka, Reo Ehara, Sigeru Itoi, Totaro Goto, "Ion-exchange membrane electrodialytic salt production using brine discharged from a reverse osmosis seawater desalination plant," Journal of Membrane Science 222 (2003) 71-86.
Reclamation—Managing Water in the West, Desalination and Water Purification Research and Development Program Report No. 135, Pilot Testing of Zero-Discharge Seawater Desalination-Application to Selenium Removal from Irrigation Drainage, U.S. Department of the Interior Bureau of Reclamation, Apr. 2008, pp. 1-37.
Sallie J. Lee, Frank J. Liotta, Steven A. Schwartz, "A New Generation of Gypsum Dispersing Agents," Global Gypsum Conference 2003—Barcelona, Sep. 14-16, 2003, pp. 17.1-17.12.
T. Masuzawa, "Impurities Contained Inside the Crystals of Solar and Vacuum Evaporated Salts," Fifth International Symposium on Salt—Northern Ohio Geological Society, May 29-Jun. 1, 1979, Hamburg, Germany, pp. 463-473.
Seung Joon Kim, Young Geun Lee, Sanghoun Oh, Yun Seok Lee, Young Mi Kim, Moon Gu Jeon, Sangho Lee, in S. Kim, Joon Ha Kim, "Energy saving methodology for the SWRO desalination process: controrl of operating temperature and pressure," Desalination 249 (2009) 260-270.
Peter Eriksson, Markus Kyburz, Wil Pergande, "NF membrane characteristics and evaluation for sea water processing applications," Desalination 184 (2005) 281-294.

(56) References Cited

OTHER PUBLICATIONS

EPA Selenium Purification (1991) pp. 1-8.

* cited by examiner

SYSTEM FOR REMOVING HIGH PURITY SALT FROM A BRINE

CROSS REFERENCE TO RELATED APPLICATIONS

This application benefits from the priority of U.S. Provisional Patent Application No. 61/682,596, entitled "System for Removing High Purity Salt from a Brine" filed Aug. 13, 2012, which is hereby incorporated by reference in its entirety.

The following applications are also incorporated by reference in their entirety:
U.S. Provisional Patent Application No. 61/682,585, entitled "System for Removing Minerals from a Brine Using Electrodialysis," filed Aug. 13, 2012,
U.S. Provisional Patent Application No. 61/682,590, entitled "Heating System for Desalination" filed Aug. 13, 2012,
U.S. Provisional Patent Application No. 61/682,603, entitled "System for Rinsing Electrodialysis Electrodes" filed Aug. 13, 2012,
U.S. Provisional Patent Application No. 61/682,609, entitled "System for Removing Selenium from a Feed Stream" filed Aug. 13, 2012, and
U.S. Provisional Patent Application No. 61/682,612, entitled "System for Producing a Gypsum Slurry for Irrigation" filed Aug. 13, 2012.

BACKGROUND

The subject matter disclosed herein relates generally to salt purification and, more particularly, a system for removing a high purity salt from a brine.

There are several regions in the United States (e.g., the southwestern United States including New Mexico, Southern California, and parts of Texas) and throughout the world that experience shortages in potable water supplies due, in part, to the arid climate of these geographic locales. As water supplies are limited, the need for innovative technologies and alternative water supplies is important. One method for obtaining an alternative source of potable water uses desalination systems to produce the potable water.

The desalination process may involve the removal of salts from seawater, agricultural run-off water, and/or brackish ground water brines to produce potable water. Desalination may use an assortment of filtration methods, such as nanofiltration and reverse osmosis, to separate the raw stream into a desalinated water stream and a tailing stream. The tailing streams may contain various salts and other materials left over after the desalination process. Indeed, disposal of the tailing streams produced by desalination may result in soil degradation and ground water contamination. Thus, alternative and innovative uses of the tailing streams may reduce undesirable results of disposing the tailing streams.

One such alternative use may involve processing the tailing stream to remove valuable salts and other minerals. In particular, inland brackish water and seawater may be rich in sodium chloride, sulfates, magnesium, calcium, and other minerals. Membrane-based desalination systems may employ a combination of nanofiltration and reverse osmosis to facilitate the desalination and removal process. Following an initial separation of a desalinated water stream from a tailing stream, the tailing stream may be processed by a mineral and/or salt removal system. However, salt purification in membrane-based systems may result in a salt with a high number of impurities, such as calcium, magnesium, and bromide. Existing methods for removal of impurities may be inefficient and/or expensive.

BRIEF DESCRIPTION

In one embodiment, a system for removing sodium chloride from a brine includes a brine softener configured to receive the brine, to remove calcium and magnesium compounds from the brine, to produce a first output comprising the removed calcium and magnesium compounds, and to produce a second output comprising a softened brine. The system also includes a mixer fluidly coupled to the brine softener. The mixer is configured to receive the second output from the brine softener and to produce a third output comprising dissolved sodium chloride. The system includes a first evaporator fluidly coupled to the mixer and configured to receive the third output from the mixer, to produce a fourth output comprising a sodium chloride slurry, and to produce a first intermediate output. The system also includes a second evaporator fluidly coupled to the first evaporator and configured to receive the first intermediate output, to produce a first recovery output, and to produce a second intermediate output. The second evaporator is fluidly coupled to the mixer and configured to provide the first recovery output to the mixer. The system includes a third evaporator fluidly coupled to the second evaporator and configured to receive the second intermediate output, to produce a second recovery output, and to provide the second recovery output to the mixer.

In another embodiment, a system for removing sodium chloride from a brine includes a first evaporator configured to receive a brine stream, to produce a first output comprising a sodium chloride slurry, and to produce a first intermediate output. The system also includes a second evaporator fluidly coupled to the first evaporator and configured to receive the first intermediate output, to produce a first recovery output, and to produce a second intermediate output. The system includes a third evaporator fluidly coupled to the second evaporator and configured to receive the second intermediate output and to produce a second recovery output. The first recovery output and the second recovery output are used to produce the brine stream received by the first evaporator.

In another embodiment, a system for removing sodium chloride from a brine includes a brine softener configured to receive the brine, to receive an acid, to receive a base, and to produce a first output comprising a softened brine. The system also includes a first evaporator configured to receive the softened brine, to produce a second output comprising a sodium chloride slurry, to produce a first intermediate output, and to produce a condensate output. The system includes a regenerator configured to receive the softened brine, to receive the condensate output, to produce the acid, and to produce the base.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
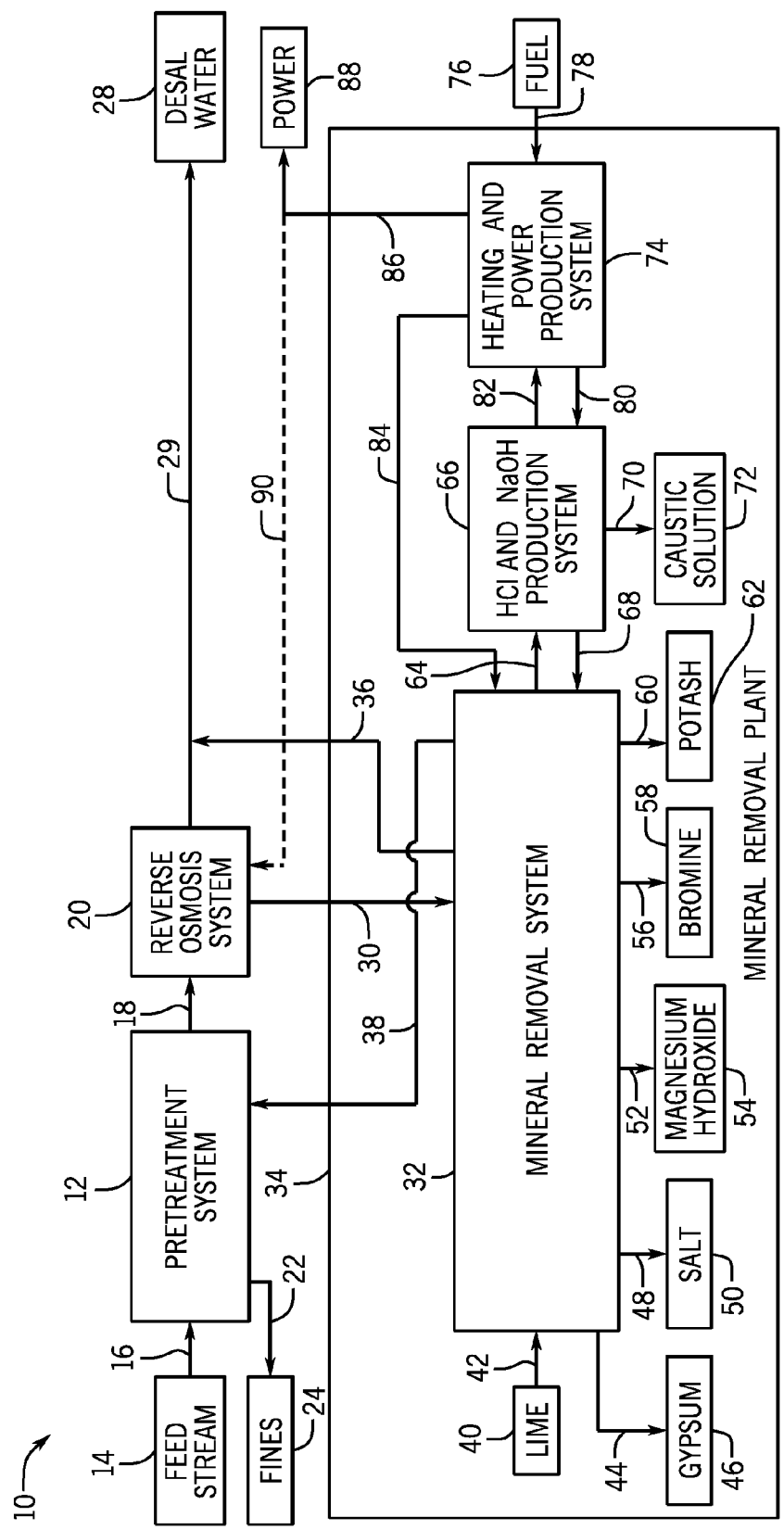
FIG. 1 is a block diagram of an embodiment of a water processing system, in accordance with aspects of the present disclosure.

FIG. 1 is a block diagram of an embodiment of a water processing system 10. The water processing system 10 is used to produce desalinated water from a feed stream and to remove minerals from the feed stream. For example, the water processing system 10 may be used to produce high purity agricultural grade gypsum (e.g., approximately greater than 97 wt % gypsum on a dry basis), industrial grade caustic (e.g., approximately greater than 97 wt % NaOH on a dry basis), industrial grade magnesium hydroxide (e.g., approximately greater than 98 wt % MgO on an ignited basis, or on an ignited oxide basis) suitable for industrial magnesia refractory, industrial grade sodium chloride (e.g., approximately greater than 99.9 wt % NaCl on a dry basis), and/or desalinated water (e.g., approximately less than 1000 wppm total dissolved solids (TDS)) from underground brines, seawater desalination waste brines, and/or brackish water desalination waste brines. Furthermore, the water processing system 10 may use a combination of one or more of gypsum precipitation, magnesium hydroxide precipitation, electrodialysis (ED), and/or softening and nanofiltration (NF) to remove the minerals from brines as industrial grade products and/or to substantially reduce (or eliminate) a waste brine stream.

In the illustrated embodiment, the water processing system 10 includes a pretreatment system 12 configured to receive a feed stream 14 as an input 16. The feed stream 14 may be received from any suitable water source. For example, the feed stream 14 may be received from ground water, seawater, brackish water, and so forth. Moreover, the feed stream 14 may contain various elements and/or compounds. For example, the feed stream 14 may contain sodium chloride (NaCl), sulfate ($SO_4$), calcium (Ca), magnesium (Mg), and/or silicon dioxide (silica or $SiO_2$). In certain embodiments, the feed stream 14 may contain approximately 0.50 to 3.00 g/l NaCl, approximately 0.10 to 1.50 g/l $SO_4$, approximately 0.01 to 0.80 g/l Ca+Mg, and/or approximately 0.01 to 0.30 g/l $SiO_2$. Furthermore, in certain embodiments, the feed stream 14 may have a pH range between approximately 5 and 9. Specifically, the feed stream 14 may have a pH of approximately 8.

The pretreatment system 12 receives the feed stream 14 and removes solid materials (e.g., fines) from the feed stream 14. The pretreatment system 12 provides the pretreated feed stream 14 as a first output 18 to a reverse osmosis (RO) system 20. Moreover, the pretreatment system 12 provides a second output 22 that contains fines 24, such as iron (Fe) and manganese (Mn). The RO system 20 receives the pretreated feed stream 14 and produces desalinated water 28 as a first output 29. In certain embodiments, the desalinated water 28 may include $SiO_2$. Moreover, the desalinated water 28 may have a pH of approximately 7.5. Furthermore, the RO system 20 provides a brine stream as a second output 30 to a mineral removal system 32. In certain embodiments, the desalinated water 28 may be approximately 70 to 90 percent of the output from the RO system 20, and the brine stream may be approximately 10 to 30 percent of the output from the RO system 20. Specifically, in some embodiments, the desalinated water 28 may be approximately 80 percent of the output from the RO system 20, and the brine stream may be approximately 20 percent of the output from the RO system 20. As may be appreciated, while the illustrated embodiment uses the RO system 20, other embodiments may use NF in place of RO.

The mineral removal system 32 is part of a mineral removal plant 34. The mineral removal plant 34 is configured to remove minerals, elements, and/or compounds from the brine stream. As may be appreciated, the brine stream may be provided to the mineral removal plant 34 from any suitable source and/or system. In certain embodiments, the brine stream may include substantial amounts of sodium chloride, sulfate, calcium, and/or magnesium. The mineral removal system 32 may provide one or more outputs 36 that include desalinated water (which may contain silicon dioxide). Furthermore, the one or more outputs 36 may include a disinfectant and/or oxidant. The disinfectant and/or oxidant may be provided to the pretreatment system 12 via an output 38.

A lime based material 40 (e.g., lime, quick lime, dolomitic lime, etc.) may be provided to an input 42 of the mineral removal system 32 to facilitate mineral removal from the brine stream. The mineral removal system 32 may be configured to remove any suitable mineral, elements, and/or compounds from the brine stream. For example, the mineral removal system 32 may provide a first output 44 including gypsum 46 (e.g., agricultural grade gypsum), a second output 48 including salt 50 (e.g., industrial grade sodium chloride), a third output 52 including magnesium hydroxide 54 (e.g., industrial grade magnesium hydroxide), a fourth output 56 including bromine 58, and/or a fifth output 60 including potash 62.

In certain embodiments, the mineral removal system 32 may provide one or more outputs 64 to a hydrochloric acid (HCl) and sodium hydroxide (NaOH) production system 66. Furthermore, the mineral removal system 32 may receive one or more inputs 68 from the HCl and NaOH production system 66. For example, the mineral removal system 32 may provide a sodium chloride brine to the HCl and NaOH production system 66. Moreover, the mineral removal system 32 may receive HCl, caustic, and/or NaOH produced by the HCl and NaOH production system 66. In certain embodiments, the HCl and NaOH production system 66 may provide an output 72 of a caustic solution 70 (e.g., NaOH) or HCl solution that is not used by the mineral removal system 32 (e.g., produced to be sold).

The mineral removal plant 34 also includes a heating and power production system 74. In certain embodiments, the heating and power production system 74 may include a natural gas engine and/or a boiler. The heating and power production system 74 is configured to receive a fuel 76 at an input 78. The fuel 76 may be any suitable fuel, such as natural gas. The heating and power production system 74 is configured to provide one or more outputs 80 to the HCl and NaOH production system 66. The one or more outputs 80 may include power, steam, hot water, any suitable heated fluid, and so forth. Moreover, the heating and power production system 74 is configured to receive a cooled fluid (such as water) via one or more inputs 82. As illustrated, the heating and power production system 74 is configured to provide power to the mineral removal system 32 via a first output 84. Moreover, the heating and power production system 74 includes a second output 86 configured to provide power 88 to another system and/or to provide a power output 90 to the RO system 20.

Figure 2:
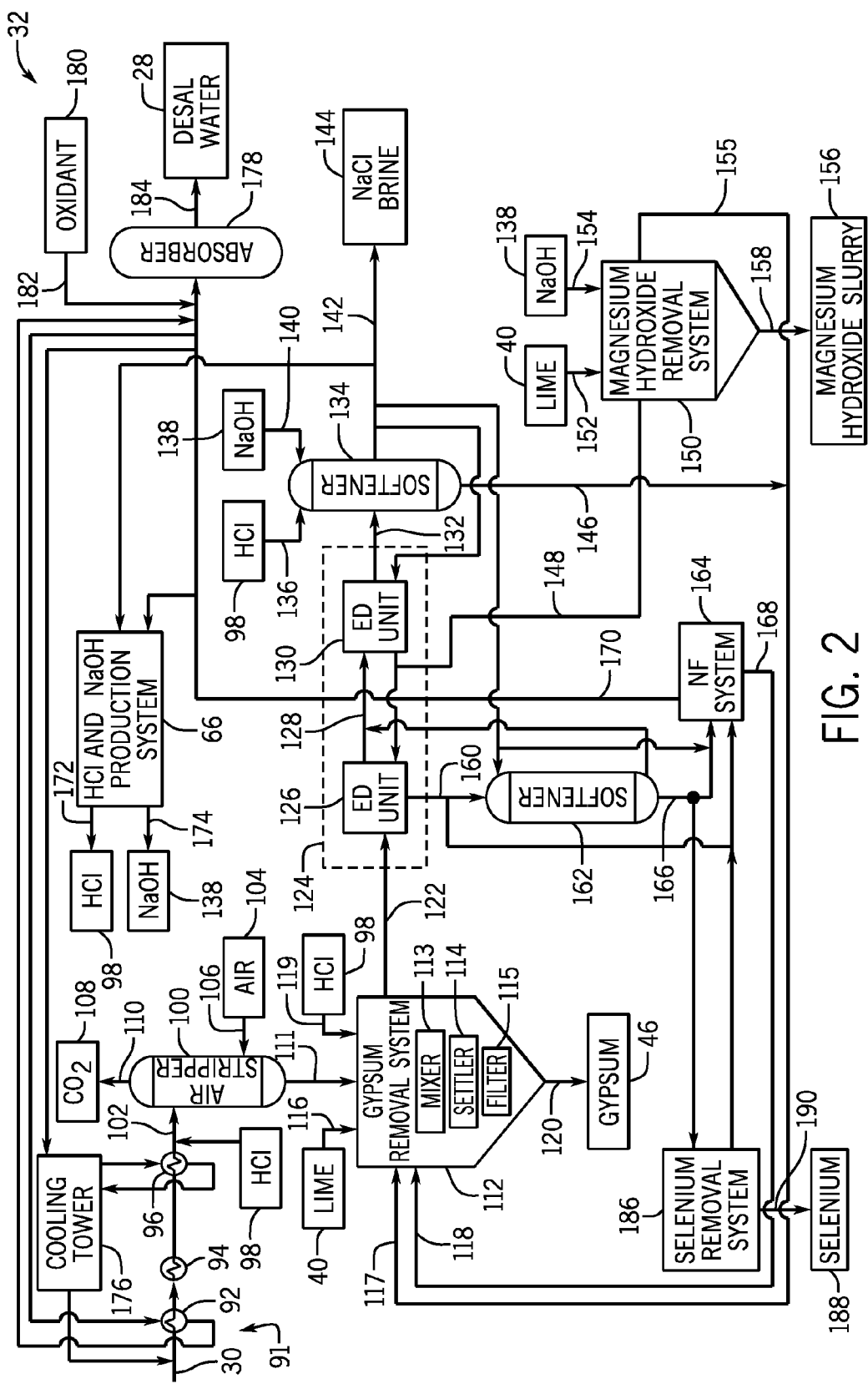
FIG. 2 is a block diagram of an embodiment of a mineral removal system, in accordance with aspects of the present disclosure.

FIG. 2 is a block diagram of an embodiment of the mineral removal system 32. As previously described, the mineral removal system 32 receives at an input the brine stream from the output 30 of the RO system 20. As may be appreciated, the brine stream may contain various elements and/or compounds. For example, the brine stream may contain NaCl, $SO_4$, Ca, Mg, and/or $SiO_2$. In certain embodiments, the brine stream may contain approximately 3.0 to 8.0 g/l NaCl, approximately 3,000 to 8,000 weight parts per million (wppm) $SO_4$, approximately 100 to 400 wppm Mg, approximately 200 to 600 wppm Ca, and/or approximately 50 to 200 wppm $SiO_2$. Furthermore, in certain embodiments, the brine stream may have a pH range between approximately 4 and 8. Specifically, the brine stream may have a pH of approximately 6. In the illustrated embodiment, a temperature control system 91 is used to control heating of the brine stream. Moreover, the temperature control system 91 includes a first heat exchanger 92, a second heat exchanger 94, and a third heat exchanger 96 to aid in controlling the temperature of the brine stream.

The brine stream is mixed with HCl 98 to convert bicarbonate ($HCO_3^-$) and carbonate ($CO_3^{2-}$) in the brine stream to $CO_2$, thereby decreasing the pH to less than 4. The acidified brine stream is routed to an air stripper 100 via a first input 102. The air stripper 100 uses air 104 provided to a second input 106 of the air stripper 100 to facilitate removal of the $CO_2$ 108 from the brine stream via a first output 110. In certain embodiments, multiple stages are used in the air stripper 100 to enable a low residual (e.g., less than approximately 2 ppm). As may be appreciated, a low $CO_2$ residual may inhibit carbonate reformation and scaling when the pH of the brine stream is increased during the various downstream brine treatment steps.

The $CO_2$ stripped brine stream is provided via a second output 111 of the air stripper 100 to a gypsum removal system 112. The gypsum removal system 112 may include a mixer 113, a settler 114, and a filter 115 to facilitate removal of the gypsum 46 from the brine stream (e.g., feed stream). Accordingly, within the mixer 113, the $CO_2$ stripped brine stream is mixed with: the lime based material 40 (e.g., lime, quick lime, dolomitic lime, etc.) received by a first input 116 of the gypsum removal system 112, recycled concentrated calcium chloride ($CaCl_2$) brine (e.g., such as a brine containing approximately 4 to 25 wt % $CaCl_2$) received by a second input 117, and recycled NF non-permeate (e.g., a sodium sulfate ($Na_2SO_4$) rich brine) received by a third input 118. In certain embodiments, such as embodiments with feed brines having a lower $Na_2SO_4$ content, the second output 111 may bypass the gypsum removal system 112. Accordingly, only the second input 117 and the third input 118 may be provided to the gypsum removal system 112. Furthermore, in such an embodiment, the second output 111 may be mixed with a brine output stream 122 from the gypsum removal system 112.

HCl 98 may be added to the gypsum removal system 112 via a fourth input 119. In certain embodiments, the lime based material 40 and the HCl 98 may be pre-mixed into the recycle calcium chloride brine stream to increase calcium content in the mixer 113 of the gypsum removal system 112 and/or in the mineral removal system 32. For example, this may be beneficial when the $SO_4$ to (Mg+Ca) molar ratio is greater than approximately 1.0 since it provides supplemental calcium to allow substantial (e.g., complete, nearly complete, etc.) sulfate removal as gypsum 46. In other embodiments, commercial calcium chloride brine, flakes, or pellets may be added to the mixer 113 of the gypsum removal system 112 when the brine stream is deficient in calcium. Furthermore, in certain embodiments, HCl 98 and limestone may also be added to the recycle calcium chloride brine and the brine stripped in a second air stripper to remove the residual $CO_2$. As may be appreciated, limestone may be procured at a lower cost than lime; however, the second air stripper may be necessitated by the use of the limestone.

The overall molar ratio of Ca to $SO_4$ in the brine stream entering the gypsum removal system 112 may be controlled to approximately 0.8 to 1.2 by calcium addition to the mixer 113 (e.g., HCl 98 plus the lime based material 40, $CaCl_2$, and/or HCl 98 plus limestone with additional air stripping) as discussed above, and/or by removing a portion of the concentrated $CaCl_2$ brine as a byproduct. Recycled gypsum 46 seed crystals are added to the mixture within the mixer 113 of the gypsum removal system 112. The calcium in the concentrated $CaCl_2$ brine stream reacts with the sulfate in the brine stream received by the gypsum removal system 112 from the air stripper 100 and the recycle NF non-permeate to precipitate gypsum 46. In certain embodiments, approximately 50% to 70% of the sulfate is removed from the brine stream. The presence of gypsum 46 seed crystals in the mixer 113 (e.g., a turbulent mixer) at neutral pH (e.g., a pH of approximately 6 to 8) may facilitate gypsum 46 precipitation kinetics, thereby enabling rapid gypsum precipitation. At the mixer 113 effluent the solution reaches near saturation conditions (e.g., slightly supersaturated) with respect to gypsum 46 and the slurry is pumped to the settler 114.

In addition to gypsum 46 precipitation, insoluble calcium fluoride ($CaF_2$) also precipitates in the mixer 113 thereby removing a substantial portion of the fluoride from the stripped brine stream; thereby inhibiting fluoride scaling in the electrodialysis (ED) system. In the settler 114 the gypsum 46 crystals settle and the saturated near solids free solution is decanted off, and filtered by the filter 115 (e.g., a sand filter, a microfilter, an ultrafilter, and so forth) to remove residual gypsum 46 particles. A small amount of softened salt brine is recycled to the settler 114 overflow to increase gypsum 46 solubility and desaturate the brine stream, thereby inhibiting scaling in the filter 115 and other downstream units. The settler 114 bottoms may be routed to a hydroclone and filter to wash (e.g., with desalinated product water) and concentrate the gypsum 46 into a saleable washed filter cake. In certain embodiments, the filter cake may include approximately 70 to 100 wt % gypsum 46. Specifically, the filter cake may include approximately 90 wt % gypsum 46. Thus, gypsum 46 is provided as an output 120 from the gypsum removal system 112. The fine solids overflow stream from the hydroclone is recycled to the mixer 113 as seed crystals. The filtrate from the filter 115 is recycled to the settler 114.

The gypsum removal system 112 may remove approximately 60 to 75% of the gypsum received from the second output 111 and produces the brine stream output 122 having a reduced amount of gypsum relative to the second output 111. For example, the brine stream output 122 (e.g., recycle brine stream output) may contain less than approximately 5 g/l gypsum, while the second output 111 may contain approximately 12 to 20 g/l gypsum. Furthermore, in certain embodiments, the brine stream output 122 may contain approximately 5.0 to 15.0 g/l NaCl and/or approximately 1,000 to 3,000 wppm $SO_4$. Moreover, the brine stream output 122 may have a pH of approximately 6. The brine stream output 122 is provided to an electrodialysis (ED) system 124. Furthermore, as illustrated, the gypsum removal system 112 is fluidly coupled to the ED system 124. In certain embodiments, a guard cartridge filter may be disposed between the brine stream output 122 and the ED system 124 to filter the brine stream output 122 thereby blocking gypsum scale from passing to the ED system 124. The ED system 124 is configured to receive the brine stream output 122 from the gypsum removal system 112, to produce a substantially sulfate hardness (e.g., Ba, Sr, Ca) free sodium sulfate solution, to produce a sodium chloride solution, and to produce a mineral solution. In the illustrated embodiment, the ED system 124 includes a first ED unit 126 that provides an intermediate output 128 to a second ED unit 130. In certain embodiments, the intermediate output 128 may include approximately 70 to 120 g/l total dissolved solids (TDS).

The first ED unit 126 (e.g., mixed chloride extraction ED) extracts a substantial portion (e.g., approximately 65% to 80%) of the magnesium chloride, calcium chloride, and sodium chloride from the brine stream output 122 using non-permselective cationic membranes and monovalent permselective anionic membranes to produce a concentrated (e.g., approximately 3 to 25 wt %) barium chloride, strontium chloride, magnesium chloride, calcium chloride, sodium chloride brine that is substantially sulfate free that is provided via the intermediate output 128 to the second ED unit 130. At a pH of approximately 6 both boric acid and silica are in a non-ionic form and thus are not extracted by the ED into the intermediate output 128 having the concentrated brine stream. As may be appreciated, barium (Ba), strontium (Sr), magnesium, and calcium chlorides are preferentially extracted versus sodium chloride through non-permselective cation membranes. Thus, a diluate brine output 160 from the first ED unit 126 is a dilute $Na_2SO_4$ brine with reduced barium, strontium, calcium, and magnesium content and very low chloride content (e.g., a substantially sulfate hardness free sodium sulfate solution). For example, the substantially sulfate hardness free sodium sulfate solution may include less than approximately 200 mg/l (Ca+Sr+Ba) and/or approximately 3 to 5 g/l sulfate.

In certain embodiments, the first ED unit 126 may include a two-stage ED configuration for mixed chloride extraction ED. For example, a first stage may extract approximately 70-90% of the mixed chlorides as a low sulfate, high concentration product concentrate. Furthermore, a second stage may be fed by the first stage diluate and the brine stream output 122. Residual mixed chlorides in the first stage diluate may be extracted into the brine stream output 122, which may be fed to the first stage. As may be appreciated, the two-stage design may increase ED power consumption and size, however, the two-stage design may facilitate a sharper separation and higher recoveries of sulfate in relation to the diluate product and chloride in relation to the mixed chloride concentrate product.

In some embodiments, a portion of an NF non-permeate from a segregated fully softened feed may be used as a supplemental rinse solution in cells adjacent to the electrode cells, thereby inhibiting calcium contamination of an electrode rinse solution. The return supplemental rinse solution may be recycled to the gypsum settler 114. Moreover, for seawater based brines, NF permeate may be used as a supplemental rinse solution (due to its high salt content and higher conductivity) which may be recycled back to the NF feed.

The high concentration calcium chloride brine from the intermediate output 128 is provided to the second ED unit 130 (e.g., a NaCl extraction ED) that selectively removes a substantial portion (e.g., approximately 80% to 95%) of the NaCl using monovalent permselective cation and anion membranes. In certain embodiments, the second ED unit 130 may include a two-stage ED configuration for NaCl extraction. For example, a first stage may extract approximately 70 to 90% of the NaCl as a low hardness, high concentration product concentrate. Moreover, the second stage may be fed by the first stage diluate and may produce a low NaCl, $CaCl_2$, $MgCl_2$ rich product diluate, and an intermediate concentration NaCl concentrate with higher hardness, which is recycled back to the feed of the first stage. As may be appreciated, the two-stage design may increase ED power consumption and size; however, the two-stage design may allow for a sharper separation and higher recoveries of $CaCl_2$ and $MgCl_2$ in relation to the diluate product and NaCl in relation to the concentrate product.

A NaCl brine (e.g., sodium chloride solution) is provided as an output 132 from the second ED unit 130. The NaCl brine has a low magnesium content and is provided (e.g., pumped) to an ion exchange brine softener 134 (e.g., such as an AMBERLITE™ IRC747 manufactured by The Dow Chemical Company of Midland, Mich.) where a substantial portion (e.g., approximately greater than 99%) of the calcium and magnesium are removed. Dilute HCl 98 is provided via an input 136 and NaOH 138 (e.g., approximately 4 wt %) is provided via an input 140 to the softener 134. The HCl 98 and the NaOH 138 are used to regenerate the ion exchange brine softener 134. The ion exchange brine softener 134 provides an output 142 of a high concentration NaCl brine 144. The high concentration NaCl brine 144 may include approximately 150 to 300 g/l NaCl. In certain embodiments, the NaCl brine 144 may be provided to the HCl and NaOH production system 66 to aid in producing HCl and NaOH. Furthermore, the NaCl brine 144 may be used to regenerate a second ion exchange softener 162, such as in brackish water feed brines. Moreover, the NaCl brine 144 may be used to produce a high purity salt for a chlor alkali plant, bleach plant, mixed oxidant plant, other chemical and industrial uses, and/or for any suitable purpose. As illustrated, a purge stream may provide the NaCl brine 144 to the second ED unit 130. The pH of the purge stream may be controlled to approximately 2.5 by HCl 98 injection, thereby converting residual fluoride to hydrogen fluoride (HF) and inhibiting fluorite scaling or NaCl brine contamination with fluoride. In certain embodiments, RO permeate or other low sulfate, low silica, low boric acid containing water may be added to prevent gypsum scaling if there is significant leakage of sulfate through the monovalent anion permselective membrane in the first ED unit 126. A low volume softener reject stream containing the calcium and magnesium may be provided by an output 146 and recycled directly to the settler 114 of the gypsum removal system 112.

The second ED unit 130 produces a concentrated $CaCl_2$, $MgCl_2$ brine stream low in NaCl (e.g., mineral solution) that is provided via an output 148. The output 148 is recirculated to the first ED unit 126 to aid in further extraction of the NaCl and the production of the high concentration NaCl brine 144. Furthermore, the output 148 is provided to a magnesium hydroxide removal system 150. As illustrated, the ED system 124 is fluidly coupled to the magnesium hydroxide removal system 150. In some embodiments (e.g., brackish water), the brine stream may contain approximately 500 to 2,000 wppm $SO_4$ and/or approximately 500 to 2000 wppm Mg, while in other embodiments (e.g., seawater), the brine stream may contain approximately 1,500 to 4,000 wppm $SO_4$ and/or approximately 600 to 2500 wppm Mg. Furthermore, the brine stream may have a pH of approximately 6. Moreover, the brine stream may include approximately 40 to 60 g/l TDS. In certain embodiments, the magnesium hydroxide removal system 150 may include a mixer (e.g., mixer 113), a settler (e.g., settler 114), and a filter (e.g., filter 115) to facilitate removal of the magnesium hydroxide from the concentrated $CaCl_2$, $MgCl_2$ brine stream (e.g., feed stream). In some embodiments, the magnesium hydroxide removal system 150 may be configured to remove approximately 90 to 98% of Mg from the brine stream.

The low NaCl concentrated $CaCl_2$/$MgCl_2$ product brine from the ED system 124 is enriched in magnesium and lean in sulfate due to the upstream gypsum removal system 112, and the ED system 124. In certain embodiments, the brine provided to the output 148 may be approximately 1 to 15% of the brine stream 30 provided to the mineral removal system 32. The lime based material 40 (e.g., lime, dolomitic lime, etc.) is provided to the magnesium hydroxide removal system 150 via an input 152 to precipitate magnesium hydroxide. A similar arrangement to the gypsum removal system 112 (e.g., mixer 113, settler 114, filter 115, etc.) may be used to produce a washed magnesium hydroxide filter cake and a low magnesium effluent brine. A portion of the magnesium hydroxide removal system 150 effluent may be used to produce a slaked lime slurry to facilitate lime mixing with the $CaCl_2$/$MgCl_2$ ED product brine. In addition to the lime based material 40, excess NaOH 138, such as from the HCl and NaOH production system 66, may be provided to the magnesium hydroxide removal system 150 via an input 154, thereby facilitating a reduction in the lime based material 40 and/or reducing the $CaCl_2$ export for brines with high (Ca+Mg) to $SO_4$ molar feed ratios (e.g., where the ratio of (Ca+Mg) to $SO_4$ is greater than approximately 1.0).

Overflow from a settler of the magnesium hydroxide removal system 150 may provide an output 155 of concentrated $CaCl_2$ brine that is recycled back to the gypsum removal system 112. The $CaCl_2$ in the brine combines with sulfate in the primary gypsum settler 114 to facilitate precipitation of gypsum 46. In certain embodiments, the output 155 may have a pH of approximately 10. The magnesium hydroxide removal system 150 outputs magnesium hydroxide slurry 156 via an output 158. In certain embodiments, the magnesium hydroxide slurry 156 may include greater than approximately 98 wt % magnesium oxide (MgO) on a calcinated basis.

Returning to the first ED unit 126, the first ED unit 126 provides an ED dilute stream (e.g., a substantially sulfate hardness free sodium sulfate solution) to an output 160. Moreover, for low salinity brackish water feeds (e.g., NaCl less than approximately 10 g/l) provided to the mineral removal system 32, the ED diluate stream from the first ED unit 126 has a TDS content of less than approximately 7 g/l (e.g., 5 g/l). Accordingly, as illustrated, the ED diluate stream from the first ED unit 126 is provided to a strong acid cation (SAC) ion exchange softener 162. The lower TDS content of the ED diluate stream enables the use of SAC ion exchange softening resins which are regenerated using NaCl brine 144, as discussed previously. The SAC ion exchange softener 162 exchanges calcium and magnesium ions in the ED diluate stream for sodium and inhibits gypsum scaling in a downstream NF system 164 that receives an output 166 from the SAC ion exchange softener 162. As illustrated, a purge stream of the NaCl brine 144 may be provided to the NF system 164 in conjunction with the output 166 to facilitate descaling.

All or part of the ED diluate stream is routed to the SAC ion exchange softener 162 based a scaling potential of the NF system 164. Relatively high sulfate hardness levels in the SAC softener effluent 166 (e.g., approximately 10-100 ppm) are used to minimize brine consumption. SAC ion exchange softener 162 resins are regenerated using the NaCl brine 144, and the spent brine from regeneration containing mainly $CaCl_2$ and $MgCl_2$ with residual NaCl is routed to the second ED unit 130, thereby facilitating recycling of the residual NaCl for producing the concentrated CaCl2, MgCl2 brine low in NaCl suitable for feed to the magnesium hydroxide removal system 150. As may be appreciated, for seawater based NF brines or high salinity feed brines, softening is not required to inhibit gypsum scaling in the downstream NF system 164. This is because the elevated NaCl content in the NF feed and non-permeate increases the gypsum solubility, thereby inhibiting scaling in the NF unit.

The ED diluate stream from the first ED unit 126, which has been optionally softened by the SAC ion exchange softener 162 is routed to the NF system 164 via outputs 160 and/or 166. In certain embodiments, approximately 60 to 80% of the ED diluate stream permeates the NF. The remaining 20 to 40% NF non-permeate contains substantially all of the sulfate, approximately 60 to 90% of the calcium, approximately 80 to 90% of the magnesium, and approximately 20 to 50% of the NaCl. Thus, a non-permeate stream output from the NF system 164 via output 168 is slightly supersaturated with respect to gypsum 46 (e.g., 1.6 saturation index defined as ion product/Ksp, which corresponds to a dissolved gypsum content of 125% of saturation). Significant scaling does not occur on the NF membranes of the NF system 164 because the kinetics of gypsum crystallization are slow in the NF membranes (e.g., no seed crystals, acidic pH, low mixing turbulence, etc.).

Periodically (e.g., approximately every 6-8 hours) a slug of high purity NaCl brine (e.g., 100-200 g/l NaCl, less than 50 ppm Ca, less than 20 ppm SO4) is injected individually into each NF element of the NF system 164. This may result in a brief (e.g., 30 second) period of reverse flow across the NF membrane in a direct osmosis, high salinity process. The high purity NaCl brine directs the gypsum microcrystals to be removed from the surface of the NF elements and dissolved in the NaCl brine, thereby inhibiting long term growth of gypsum scale since the seed microcrystals are removed before scaling kinetics can accelerate. The supersaturated NF non-permeate containing substantially all of the sulfate is recycled to the settler 114 of the gypsum removal system 112 via the output 168. In certain embodiments, the supersaturated NF non-permeate may contain approximately 8,000 to 12,000 wppm $SO_4$, approximately 300 to 500 wppm Ca, approximately 100 to 300 wppm Mg, approximately 0.8 to 1.5 g/l NaCl, and/or approximately 15 to 25 g/l TDS.

An NF permeate stream is provided via an output 170 from the NF system 164. For low salinity brackish water brine feeds the NF permeate stream may have a low TDS and thereby may meet EPA drinking water standards. Furthermore, as may be appreciated, NF membranes with increased NaCl removal may be desirable to produce drinking water with lower TDS content. It should be noted that the selection of the NF membrane may be made so that silica concentration and scaling does not occur on the NF membrane with high NaCl removal.

As illustrated, the NF permeate stream from output 170 is provided to the HCl and NaOH production system 66. The HCl and NaOH production system 66 is used to produce one or more HCl 98 outputs 172 and/or to produce one or more NaOH 138 outputs 174. Furthermore, the NF permeate stream from output 170 may be provided to the first heat exchanger 92 to facilitate heat transfer from the brine stream 30 to the NF permeate. Moreover, the NF permeate stream from output 170 may be provided to a cooling tower 176 where the NF permeate stream is cooled before flowing through the third heat exchanger 96 to facilitate heat transfer from the brine stream 30 to the NF permeate. As illustrated, the cooling tower 176 may also provide a portion of the NF permeate stream to the brine stream 30.

As may be appreciated, arsenic (e.g., as arsenite) in the brine stream 30 (e.g., from brackish groundwater treatment) may pass through the gypsum removal system 112 and the NF system 164, thereby ending up in the NF permeate stream from the output 170. Accordingly, in certain embodiments, the arsenic is not removed by NF membranes. If necessary to meet drinking water standards the arsenic may be removed from the NF permeate stream using an arsenic absorber 178. Within the arsenic absorber 178, the NF permeate stream is chlorinated with chlorine, sodium hypochlorite, and/or mixed oxidant 180 received via an input 182 thereby converting the arsenite to arsenate. The stream is then routed to a granular ferric hydroxide (GFH) or granular ferric oxide (GFO) absorption bed where the arsenate is absorbed and chemically sequestered as non-leachable ferric arsenate. Periodically the spent GFH or GFO may be removed and/or stored onsite for future arsenic reclaiming. Moreover, fresh GFH or GFO may be provided into the absorption beds. The absence of essentially all the sulfate and chloride in the NF permeate water along with its slightly acidic pH (e.g., approximately 5 to 6), make the GFH or GFO absorption of arsenic highly efficient and cost effective. The desalinated water 28 is provided by an output 184 from the arsenic absorber 178. While the arsenic absorber 178 is included in the illustrated embodiment, other embodiments may not include the arsenic absorber 178. In certain embodiments, the desalinated water 28 may contain approximately 50 to 150 mg/l $SiO_2$, approximately 10 to 50 mg/l Ca+Mg, approximately 0.3 to 0.9 g/l NaCl, and/or approximately 500 to 1000 ppm TDS.

In certain embodiments, a slipstream of the softened ED diluate stream from the first ED unit 126 may be routed to a biological or chemical selenium removal system 186. The selenium may be concentrated in this stream because it typically exists as selenate which has similar properties to sulfate. Moreover, the selenium does not permeate NF or anion monovalent permselective ED membranes and is more soluble than sulfate in the presence of calcium. Thus, the low NaCl, sulfate, $MgCl_2$ and $CaCl_2$ concentration in the ED diluate stream provide optimal conditions for the chemical or biological removal processes. For example, in certain embodiments, the ED diluate stream may contain approximately 3,000 to 5,000 wppm $SO_4$, approximately 100 to 150 wppm Ca, approximately 25 to 75 wppm Mg, and/or approximately 0.5 to 1.0 g/l NaCl. The selenium removal system 186 is configured to remove selenium from the ED diluate stream, to provide selenium 188 from a first output 190, and to provide a substantially selenium free ED diluate stream to the NF system 164.

Figure 3:
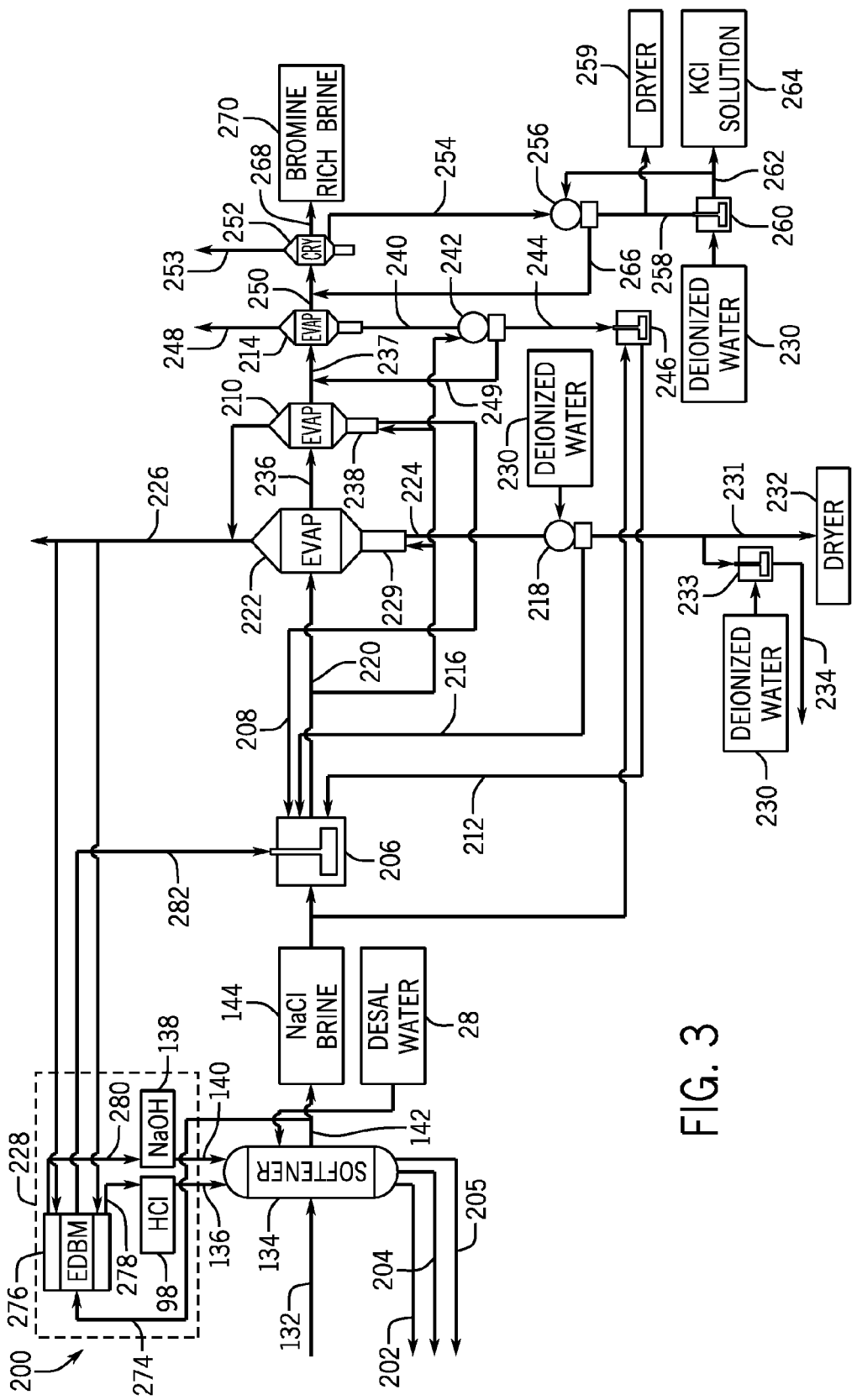
FIG. 3 is a block diagram of an embodiment of a sodium chloride production system, in accordance with aspects of the present disclosure.

FIG. 3 is a block diagram of an embodiment of a sodium chloride (e.g., NaCl, salt) production system 200. The sodium chloride production system 200 is configured to produce a high purity salt (e.g., low in calcium, magnesium, sulfate, bromine, approximately greater than 99.9 wt % NaCl on a dry basis, etc.) from a NaCl rich brine, such as a NaCl rich brine from a membrane based desalination plant. In certain embodiments, seawater, brackish water, or some other water is processed in a desalination plant (e.g., mineral removal system 32) equipped with a combination of nanofiltration membranes, reverse osmosis membranes, and/or electrodialysis membranes equipped with monovalent permselective membranes. The desalination plant is used to produce desalinated water and a low sulfate, low calcium, low magnesium concentrated NaCl brine (e.g., approximately 15 to 22 wt % NaCl—unsaturated).

The sodium chloride production system 200 receives the NaCl brine, such as from the output 132 of the ED system 124. As discussed above, the NaCl brine is softened in the ion exchange brine softener 134. The softener 134 may use multiple softening beds in series to facilitate removal of calcium and magnesium (e.g., to obtain a hardness of less than approximately 10 ppb), and/or to allow for regeneration. For example, in some embodiments, the softener 134 may include a three bed merry go round system (e.g., two softening beds in series, one regenerating bed), while in other embodiments the softener 134 may include a two bed lead/lag system (e.g., two softening beds in series) in which feed and product brine storage are used.

The ion exchange brine softener 134 may be periodically regenerated and/or neutralized with the dilute (e.g., approximately 4 wt %) HCl 98 and the NaOH 138. Moreover, desalinated water 28 may be used for rinsing the softener 134 before, between, and/or after regeneration and neutralization.

An acidic (e.g., HCl) $CaCl_2$, $MgCl_2$ dilute (e.g., approximately 5 wt %) spent brine is provided from the softener 134 via an output 202 and may be routed to an inlet section of the desalination plant for neutralizing carbonate and/or bicarbonate in the feed water, thereby blocking carbonate scaling on desalination membranes and facilitating air stripping removal of carbonate and/or bicarbonate as $CO_2$. In certain embodiments, carbonate and/or bicarbonate removal is used for magnesium recovery from brines using lime and/or dolime precipitation.

A spent caustic is provided from the softener 134 via an output 204. The spent caustic may be a dilute (e.g., less than approximately 1 wt %) NaOH stream that is provided separately to the desalination plant. In certain embodiments, the spent caustic may be mixed with the feedwater downstream of $CO_2$ air stripping and/or nanofiltration where carbonate content is low. The spent caustic may be used to facilitate increasing the desalination feedwater pH and thereby enhancing magnesium recovery (e.g., for desalination plants with magnesium recovery). Furthermore, the spent caustic may be used to improve boron removal by reverse osmosis membranes.

Moreover, a spent desalinated water rinse stream is provided from the softener 134 via an output 205. The spent desalinated water rinse stream may be a dilute (e.g., less than approximately 1 wt %) NaCl brine stream that contains small amounts of calcium and magnesium. The spent desalinated water rinse stream may be routed to the inlet section of the desalination plant and/or mixed with filtered feed seawater, brackish water, or another water upstream of a final polishing filter (e.g., ultrafiltration, slow sand filtration, etc.).

The NaCl brine 144 is provided from the softener 134 to a mixer 206 (e.g., dissolver) that is fluidly coupled to the softener 134. The mixer 206 is used to combine (e.g., mix, dissolve, etc.) the softened NaCl brine 144, NaCl from a first recovery output 208 from a second evaporator crystallizer 210, and NaCl from a second recovery output 212 from a third evaporator crystallizer 214 to result in a recycle salt slurry with approximately 20 to 50 wt % (e.g., a mixture of saturated sodium chloride solution with 20 to 50 wt % suspended solid sodium chloride). As illustrated, a saturated centrate 216 from a product salt centrifuge 218 is also provided to the mixer 206. The recycled salt from the second evaporator crystallizer 210 and the third evaporator crystallizer 214 saturates the softened NaCl brine 144 and produces a saturated softened NaCl brine that is provided by the mixer 206 via an output 220. As may be appreciated, within the mixer 206, the low purity recycled salt is fully dissolved thereby releasing bromide and sulfate impurities from the salt crystals.

A majority of the saturated NaCl brine from the mixer 206 is provided to a first evaporator crystallizer 222 fluidly coupled to the mixer 206. Moreover, a small portion of the saturated NaCl brine is routed to the elutriated legs of the first and second evaporator crystallizers 222 and 210, as well as to a hydroclone and/or centrifuge 242 for NaCl cake washing. The saturated NaCl brine (e.g., a high purity feed brine) displaces a low purity mother liquor in the evaporator crystallizers and the salt cake of the hydroclone and/or centrifuge 242. Accordingly, the crystallizers may produce a salt slurry with a low amount of impurities in the slurrying brine.

The saturated NaCl brine is evaporated in the first evaporator crystallizer 222. The first, second, and third evaporator crystallizers 222, 210, and 214 may be any suitable evaporator and/or crystallizer. For example, one or more of the first, second, and third evaporator crystallizers 222, 210, and 214 may be a mechanical vapor recompression type evaporator crystallizer, a thermal vapor recompression type evaporator crystallizer, a low pressure steam evaporator, and so forth. The first evaporator crystallizer 222 produces a high purity NaCl salt (e.g., sodium chloride slurry) having low sulfate, calcium, magnesium, and bromide that is provided from the first evaporator crystallizer 222 via an output 224. As may be appreciated, in certain embodiments evaporation within the first evaporator crystallizer 222 may be limited to approximately 60 to 70% of the water fed to the first evaporator crystallizer 222. In certain embodiments, limiting evaporation within the first evaporator crystallizer 222 may minimize a concentration increase of sulfate, calcium, magnesium, and bromide impurities in the mother liquor and, thereby, may produce high purity salt crystals. Brine inclusions in the salt crystals may also be of high NaCl purity, thereby further improving product salt purity from the first evaporator crystallizer 222. As illustrated, condensate 226 may be provided from the first and second evaporator crystallizers 222 and 210 to a regenerator 228.

The crystalline salt product is removed through an elutriating leg 229 in which high purity feed brine displaces lower purity mother liquor in the discharge slurry from the first evaporator crystallizer 222. The elutriated slurry from the first evaporator crystallizer 222 is routed to the hydroclone and/or centrifuge 218 where the larger high purity crystals are separated from the slurry. As may be appreciated, in certain embodiments, deionized water 230, such as the high purity condensate 226 from the first and second evaporator crystallizers 222 and 210, is used to wash the product salt in the hydroclone and/or centrifuge 218, thereby displacing residual feed brine in the hydroclone and/or centrifuge 218 salt cake and further improving salt purity.

The high purity washed salt product (e.g., dewatered sodium chloride) from the hydroclone and/or centrifuge 218 is provided via an output 231 to storage and/or to a dryer 232 (e.g., if drying the high purity salt is desired). In certain embodiments, the high purity washed salt product may have less than approximately 54 wppm bromine. As illustrated, a portion of the high purity washed salt product may be provided to a mixer 233. Deionized water 230 may also be provided to the mixer 233 to produce a high purity NaCl brine via an output 234, such as for the softener 134 regeneration. As discussed above, the hydroclone overflow, the centrate liquid, and/or the spent centrate wash water may be recycled back to the feed brine tank (e.g., to be provided to the softener 134), or to the mixer 206 via the output 216.

A purge brine flow (e.g., first intermediate output) from the first evaporator crystallizer 222 is provided via an output 236 to the second evaporator crystallizer 210. Furthermore, a purge brine flow (e.g., second intermediate output) from the second evaporator crystallizer 210 is provided via an output 237 to the third evaporator crystallizer 214. As may be appreciated, the first evaporator crystallizer 222 is fluidly coupled to the second evaporator crystallizer 210, and the second evaporator crystallizer 210 is fluidly coupled to the third evaporator crystallizer 214 and to the mixer 206. The second and third evaporator crystallizers 210 and 214 operate similarly to the first evaporator crystallizer 222. For example, the second and third evaporator crystallizers 210 and 214 may limit evaporation therein to approximately 65 to 70% of the water fed to a respective evaporator to facilitate producing high salt purity.

Salt slurry from elutriating leg 238 of the second evaporator crystallizer 210 and the salt solution 212 from a mixer 246 is recycled to the mixer 206. The salt in the recycle slurry redissolves in the mixer 206, thereby saturating the brine in the mixer 206. The elutriated salt slurry 240 from the third evaporator crystallizer 214 is routed to the hydroclone and/or centrifuge 242 (e.g., purge NaCl centrifuge 242). A salt output 244 from the hydroclone and/or centrifuge 242 is provided to the mixer 246. NaCl brine 144 may also be provided to the mixer 246 to dissolve the salt output 244. As illustrated, the third evaporator crystallizer 214 includes a vent 248 to facilitate condensate escaping the third evaporator crystallizer 214. As illustrated the hydroclone overflow, the centrate liquid, and/or spent centrate wash brine may be recycled to the third evaporator crystallizer 214 via an output 249 from the hydroclone and/or centrifuge 242.

A hot brine (e.g., a third intermediate output) from the third evaporator crystallizer 214 is provided via an output 250 to a vacuum crystallizer 252 in which the hot brine is vacuum flashed. The vacuum flashing may remove up to approximately 15% of the water from the hot brine as vacuum condensate output via a vent 253, and may cool the brine to a temperature of less than approximately 100° F. A potassium chloride slurry (e.g., KCl salt) may be removed in the vacuum crystallizer because its solubility is lower than NaCl at low temperatures. Accordingly, the potassium chloride slurry may be provided from the vacuum crystallizer 252 via an output 254 to a hydroclone and/or centrifuge 256 configured to remove the KCl. As may be appreciated, the KCl cake may be washed with condensate or product KCl solution 262 to displace the mother liquor brine in a centrifuge salt cake of the hydroclone and/or centrifuge 256. The washed KCl product is provided from the hydroclone and/or centrifuge 256 via an output 258 to storage or to a dryer 259 if dried KCl product is desired. In addition, the KCl product may be redissolved using a mixer 260 and the deionized water 230 to provide an output 262 that may be sold as a KCl fertilizer solution 264. As illustrated, the hydroclone overflow, the centrate liquid, and/or spent centrate wash water may be recycled back to the KCl vacuum crystallizer via an output 266 from the hydroclone and/or centrifuge 256.

Via an output 268, the vacuum crystallizer 252 provides a cool (e.g., temperature of less than approximately 100° F.) purge bromine rich brine 270. The bromine rich brine 270 includes residual sulfate, calcium, magnesium, and bromine impurities from the NaCl brine 144. As may be appreciated, the bromine rich brine 270 may have a bromine concentration of greater than approximately 5 g/l, thereby facilitating extraction of bromine from the brine.

A portion of the softened NaCl brine 274 is routed to the regenerator 228 having an electrodialysis bipolar membrane (EDBM) system 276. The EDBM system 276 is used to produce the dilute (e.g., approximately 4 wt %) HCl 98 (e.g., acid) via an output 278 and the NaOH 138 (e.g., base) via an output 280. In certain embodiments, a solution containing the NaOH 138 may include approximately 1000 ppm NaCl for brine ion exchange softener 134 regeneration. The EDBM system 276 may also produce dilute NaOH (e.g. approximately 7 to 15 wt %) which may be purified by ion exchange and concentrated by evaporation to produce concentrated (e.g., approximately 30 to 50 wt %), high purity NaOH for export (e.g., because more dilute HCl is required for resin regeneration than dilute NaOH for resin neutralization). Moreover, the EDBM system 276 may be configured to remove magnesium and/or calcium from an ion exchange resin. Spent brine from the EDBM system 276 is provided via an output 282 to the mixer 206 where it may be resaturated. As discussed above, the condensate 226 from the first and second evaporator crystallizers 222 and 210 may be used as makeup for the EDBM 276 for producing the HCl 98 and the NaOH 138 solutions.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for removing sodium chloride from a brine, comprising:
   an ion exchange brine softener configured to receive the brine, to remove calcium and magnesium compounds from the brine, to produce a first output comprising the removed calcium and magnesium compounds, and to produce a second output comprising a softened brine;
   a mixer directly fluidly coupled via a first conduit to the ion exchange brine softener and comprising an outlet, wherein the mixer is configured to receive the second output from the ion exchange brine softener and to produce a third output comprising the softened brine;
   a first evaporator fluidly coupled to the mixer comprising an inlet, wherein the first evaporator is configured to receive the third output from the mixer, to produce a fourth output comprising a sodium chloride slurry, to produce a first intermediate output, and to produce a condensate;
   a second conduit extending between the outlet of the mixer and the inlet of the first evaporator, wherein the conduit comprises a first end configured to be directly coupled to the outlet of the mixer and a second end configured to be directly coupled to the inlet of the first evaporator, and wherein the conduit is configured to direct the third output from the mixer to the first evaporator;
   a second evaporator directly fluidly coupled via a third conduit to the first evaporator and configured to receive the first intermediate output, to produce a first recovery output, and to produce a second intermediate output, wherein the second evaporator is directly fluidly coupled via a fourth conduit to the mixer and configured to provide the first recovery output to the mixer;
   a third evaporator directly fluidly coupled via a fifth conduit to the second evaporator and configured to receive the second intermediate output, to produce a second recovery output, and to provide the second recovery output to the mixer, wherein the mixer is configured to use the first and second recovery outputs to produce the third output received by the first evaporator; and
   a regenerator configured to receive a portion of the second output, to receive the condensate, to produce an acid, a base, or both, and to provide the acid, the base, or both, to the ion exchange brine softener.

2. The system of claim 1, comprising a centrifuge configured to receive the fourth output from the first evaporator and to produce a fifth output comprising a dewatered sodium chloride.

3. The system of claim 1, comprising a crystallizer configured to receive a third intermediate output from the third evaporator, to produce a fifth output comprising a potassium chloride slurry, and to produce a sixth output comprising a bromine rich brine.

4. The system of claim 3, comprising a centrifuge configured to receive the fifth output from the crystallizer and to produce a seventh output comprising potassium chloride.

5. The system of claim 4, comprising a second mixer configured to receive the seventh output from the centrifuge and to produce an eighth output comprising a potassium chloride solution.

6. The system of claim 1, wherein the regenerator comprises an electrodialysis bipolar membrane configured to remove the magnesium and calcium from an ion exchange resin.

7. The system of claim 1, comprising a second conduit that extends between and is couple to a second inlet of the mixer and a second outlet of the second evaporator, wherein the second conduit is configured to direct the first recovery output to the mixer.

8. A system for removing sodium chloride from a brine, comprising:
   a first mixer;
   a first evaporator coupled to the first mixer, wherein the first evaporator is configured to receive a softened brine stream from the first mixer, to produce a first output comprising a sodium chloride slurry, and to produce a first intermediate output;
   a first conduit extending between an inlet of the first evaporator and an outlet of the first mixer, wherein the first conduit is configured to directly fluidly couple the first evaporator with the first mixer, wherein the first conduit comprises a first end configured to be directly coupled to the inlet of the first evaporator and a second end configured to be directly coupled to the outlet of the first mixer, and wherein the first conduit is configured to direct the softened brine from the first mixer to the first evaporator;
   a second evaporator directly fluidly coupled via a second conduit to the first evaporator and configured to receive the first intermediate output, to produce a first recovery output, and to produce a second intermediate output;
   a third evaporator directly fluidly coupled via a third conduit to the second evaporator and configured to receive the second intermediate output and to produce a second recovery output, wherein a first flow path extending between the second evaporator and the first mixer is configured to direct the first recovery output to the first mixer, and wherein a second flow path extending between the third evaporator and the first mixer is configured to direct the second recovery output to the first mixer; and an electrodialysis bipolar membrane (EDBM) configured to receive the at least a portion of the softened brine stream, to receive a condensate output, to produce an acid, to produce a base, and to provide the acid and the base to a ion exchange brine softener, wherein the first evaporator is configured to produce the condensate output.

9. The system of claim 8, comprising a centrifuge configured to receive the first output from the first evaporator and to produce a second output comprising a dewatered sodium chloride.

10. The system of claim 9, comprising a dryer configured to dry the second output.

11. The system of claim 8, comprising a crystallizer configured to receive a third intermediate output from the third evaporator, to produce a second output comprising a potassium chloride slurry, and to produce a third output comprising a bromine rich brine.

12. The system of claim 11, comprising a centrifuge configured to receive the second output from the crystallizer and to produce a third output comprising potassium chloride.

13. The system of claim 12, comprising a second mixer configured to receive the third output from the centrifuge and to produce a fourth output comprising a potassium chloride solution.

14. The system of claim 8, comprising the ion exchange brine softener configured to receive the brine, to remove calcium and magnesium compounds from the brine, to produce a second output comprising the removed calcium and magnesium compounds, and to produce a third output comprising the softened brine.

15. The system of claim 14, wherein the ion exchange brine softener is fluidly coupled to a mixer configured to receive the third output from the ion exchange brine softener via a conduit extending between and coupled to an outlet of the ion exchange brine softener and an inlet of the mixer, and the second evaporator and the third evaporator are configured to provide the first recovery output and the second recovery output, respectively, to the mixer.

16. A system for removing sodium chloride from a brine, comprising:
an ion exchange brine softener comprising a first inlet and configured to receive the brine, to receive an acid, to receive a base, to remove calcium and magnesium compounds from the brine, to produce a first output stream having the removed calcium and magnesium compounds, and to produce a second output comprising a softened brine;
a mixer comprising a first outlet, wherein the mixer is configured to receive the second output from the ion exchange brine softener and to produce a third output comprising the softened brine;
a first evaporator comprising a second inlet, wherein the first evaporator is fluidly coupled to the mixer and configured to receive the third output, to produce a fourth output comprising a sodium chloride slurry, to produce a first intermediate output, and to produce a condensate output;
a first conduit extending between the first outlet of the mixer and the second inlet of the first evaporator, wherein the first conduit comprises a first end configured to be directly coupled to the first outlet of the mixer and a second end configured to be directly coupled to the second inlet of the first evaporator, and wherein the first conduit is configured to direct the third output from the mixer to the first evaporator
an electrodialysis bipolar membrane (EDBM) comprising a second outlet and configured to receive the at least a portion of the second output from the ion exchange brine softener, to receive the condensate output, to produce the acid, and to produce the base;
a second conduit extending between and directly coupled to the first inlet of the ion exchange brine softener and the second outlet of the EDBM and configured to direct the acid or the base from the EDBM to the ion exchange brine softener; and
a second evaporator directly fluidly coupled via a third conduit to the first evaporator and configured to receive the first intermediate output, to produce a first recovery output, and to produce a second intermediate output.

17. The system of claim 16, comprising a third evaporator directly fluidly coupled to the second evaporator via a third conduit and configured to receive the second intermediate output, and to produce a second recovery output, wherein the mixer is configured to use the first recovery output and the second recovery output to produce the softened brine received by the first evaporator.

\* \* \* \* \*